Feb. 20, 1962 W. C. TYNER 3,022,497
VARIABLE ORIFICE DEVICE
Filed Oct. 10, 1956 3 Sheets-Sheet 1
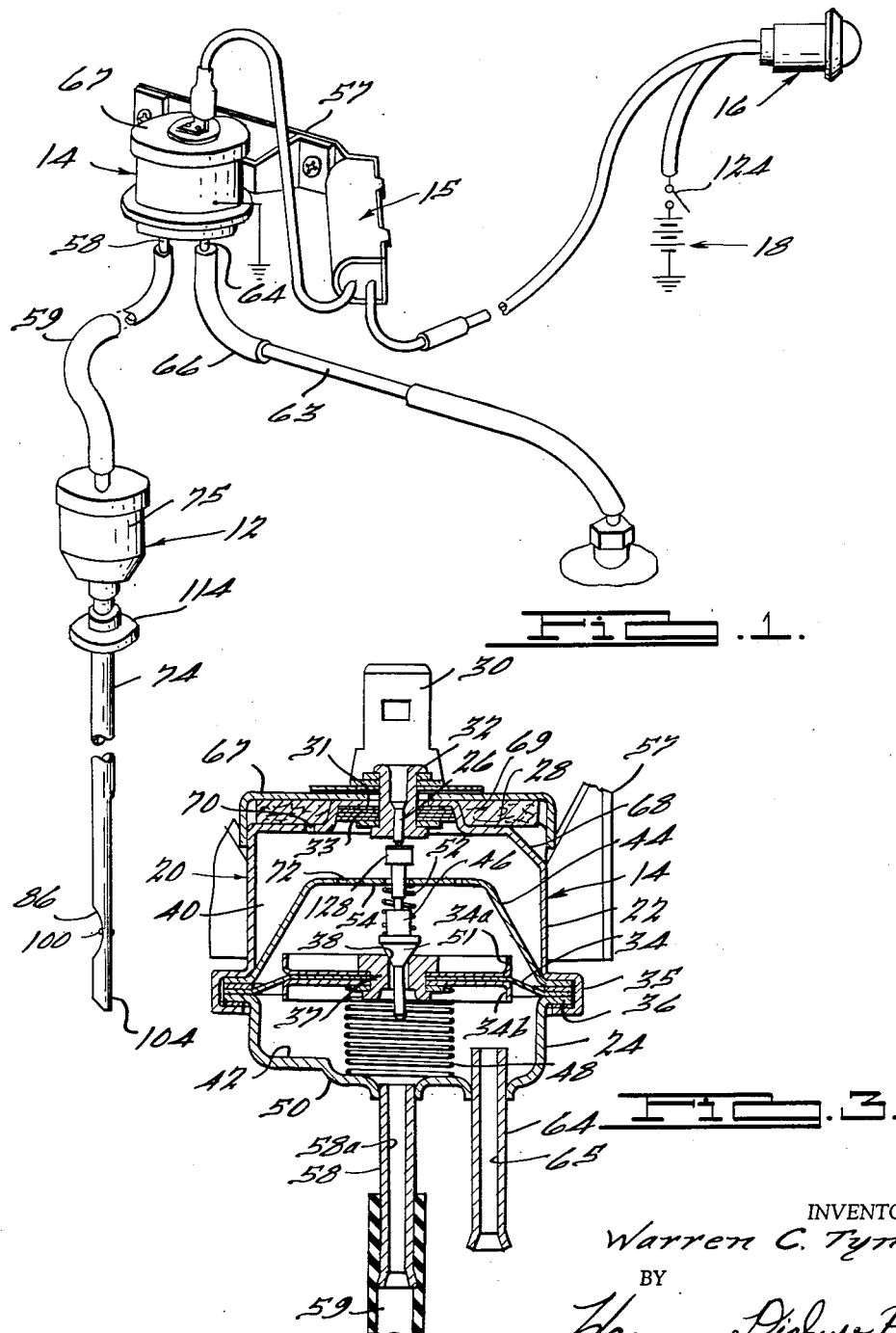
INVENTOR.
Warren C. Tyner.
BY
Harness, Dickey & Pierce
ATTORNEYS.

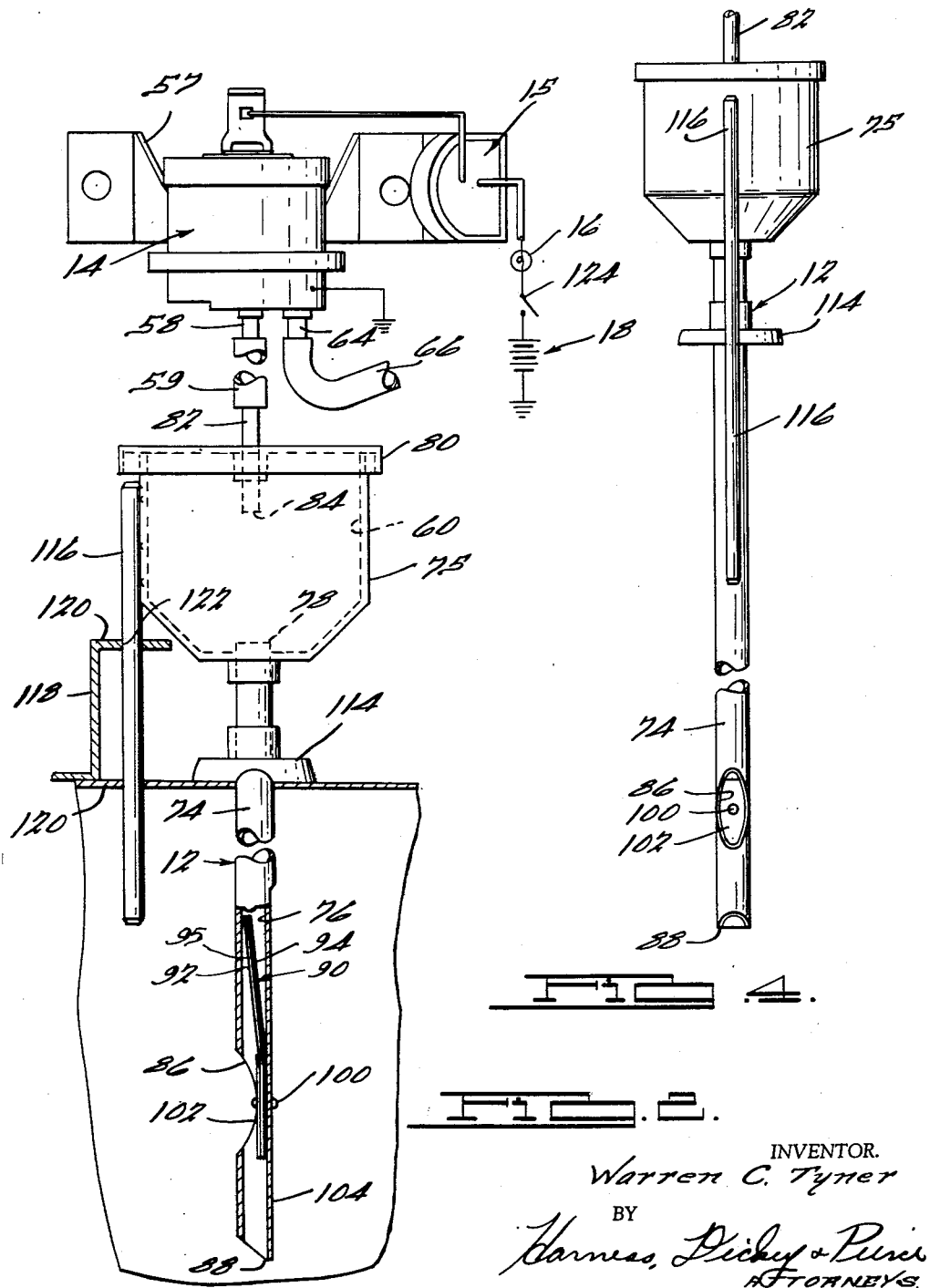

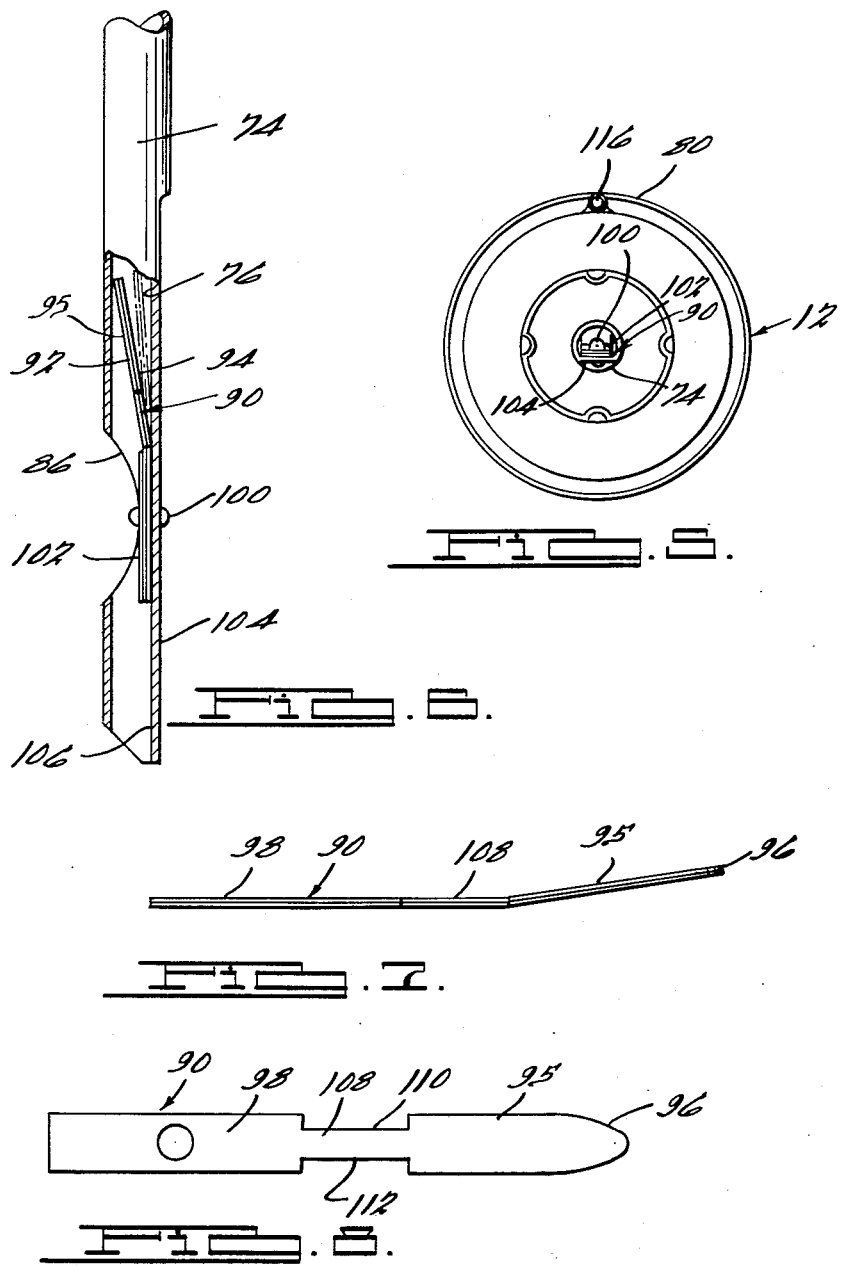

United States Patent Office 3,022,497
Patented Feb. 20, 1962

3,022,497
VARIABLE ORIFICE DEVICE
Warren C. Tyner, Ann Arbor, Mich., assignor to King-Seeley Thermos Co., a corporation of Michigan
Filed Oct. 10, 1956, Ser. No. 615,138
3 Claims. (Cl. 340—244)

This invention relates to fluid level signal systems and, more particularly, to an improved variable orifice device particularly adapted for use in a signal system responsive to a critical oil level condition in an internal combustion engine.

An object of the invention is to provide an improved variable orifice device for the indicated character incorporating improved means for rendering the discharge rate of liquid from the device partially or entirely insensitive to changes in the liquid temperature and viscosity.

Another object of the invention is to provide an improved variable orifice device which is particularly adapted for use in a liquid level signal system and which incorporates improved means for preventing transient signaling due to acceleration, deceleration or other forces temporarily applied to the liquid.

Another object of the invention is to provide an improved tubular dip stick for use in an oil level signal system for an internal combustion engine.

Another object of the invention is to provide an improved tubular dip stick that is rugged in construction, durable, efficient, and reliable in operation.

The above as well as other objects and advantages of the present invention will become apparent from the following description, the appended claims, and the accompanying drawings, wherein:

FIGURE 1 is a perspective view of a variable orifice device embodying the present invention, showing the same in installed relationship in a liquid level signal system;

FIG. 2 is an elevational view of a portion of the system illustrated in FIG. 1, showing the same installed in a fragmentarily illustrated engine block;

FIG. 3 is an enlarged sectional view of the liquid level responsive switch means illustrated in FIG. 2;

FIG. 4 is an elevational view, with portions broken away, of the dip stick assembly illustrated in FIG. 1, showing the same in an angularly rotated position;

FIG. 5 is an end view of the structure illustrated in FIG. 4;

FIG. 6 is an enlarged side elevational view of a portion of the tubular dip stick assembly illustrated in FIG. 2;

FIG. 7 is an enlarged side elevational view of the temperature responsive restrictor showing the same removed from the tubular dip stick assembly; and FIG. 8 is a top plan view of the restrictor illustrated in FIG. 7.

Referring to the drawings, a tubular dip stick assembly generally designated 12 is illustrated embodying the present invention, the dip stick assembly 12 being particularly adapted for use in signal systems of the type disclosed in co-pending application of Leonard Boddy, Serial No. 615,137, filed October 10, 1956, for Fluid Level Signal Systems, and assigned to the assignee of the present invention. It will be understood, however, that the present invention is applicable to other uses.

In general, signal systems of the indicated character are particularly adapted to produce a signal in the event the oil level in the engine of an automotive vehicle reaches a dangerously low level, the term signal being used herein in a generic sense, as comprehending various types of level responsive actions. For example, these actions may be either electrical or mechanical and they may effect a control operation or produce a visual, audible or other indication. As shown, the signal system includes the dip stick assembly 12, a liquid level responsive switch, generally designated 14, a dynamic and attitude responsive switch assembly, generally designated 15, a signaling device 16 which may, for example, be an electric lamp, buzzer or other suitable device, and a source of electrical potential 18.

The switch 14 functions to complete an electric circuit through the signaling device 16 so as to energize the signaling device to warn the vehicle operator when the oil reaches a dangerously low level in the vehicle engine. The switch 14 is comprised of a housing 20 which is preferably mounted on the fire wall of the vehicle, and the housing 20 includes confronting, generally cup-shaped members 22 and 24 that may be formed, for example, as metal stampings. A contact 26 is fixed to the top wall 28 of the member 22 and is electrically connected to an exposed terminal 30 by a rivet 32, electrically insulated from the member 22, as by washers 31 and 33.

A diaphragm 34 is provided, the marginal portions of which are fixed between the members 22 and 24, as by crimping the portion 35 of the wall of the member 22 over an outwardly extending flange portion 36 provided on the member 24. The diaphragm 34 divides the housing into chambers 40 and 42 and carries a centrally disposed valve seat 37 having an opening 38 therethrough which interconnects the chambers 40 and 42 in the housing 20. The diaphragm 34 is preferably quite thin in order to render the structure quite sensitive. In order to render the central section which receives the valve seat 37 quite stable and to increase the effective area of the diaphragm, the diaphragm 34 is clamped between a pair of oppositely facing light metallic cup-shaped members 34a and 34b, which elements and the diaphragm are held in assembled relationship with respect to each other by the valve seat 37.

An inverted, generally cup-shaped guide member 44 is provided which overlies the diaphragm 34 and the marginal portions of which are crimped between the portions 35 and 36 of the members 22 and 24. The guide member 44 supports a pin 46 which serves as a movable electrical contact and which also serves as a valve that seats against the valve seat 37 and closes the opening 38 therethrough. A coil spring 48 is provided which is interposed between the diaphragm 34 and the bottom wall 50 of the member 24 so as to yieldably urge the diaphragm upwardly, as viewed in FIG. 3, against the generally frusto-conical valve head portion 51 provided on the pin 46. A coil spring 52 is also provided which is mounted on the pin 46, one end of the spring 52 bearing against the upper wall 54 of the guide member 44 while the opposite end of the spring bears against the frusto-conical valve head portion 51 of the pin 46 so as to urge the pin downwardly, as viewed in FIG. 3, against the valve seat 37. When the components of the switch 14 occupy the positions illustrated in FIG. 3, an electrical path is provided from the terminal 30 through the fixed contact 26, the pin 46, the spring 52, the guide member 44 and the member 22 which is grounded to the frame of the vehicle, as by the bracket 57, which may be mounted, for example, on the fire wall of the associated vehicle.

A centrally disposed tube 58 is provided which is fixed to the bottom wall 50 of the member 24 and which extends downwardly therefrom, as viewed in FIGS. 1–3, the bore 58a of the tube 58 communicating with the chamber 42 in the housing 20. The lower end portion of the tube 58 is connected by a flexible hose 59 to a chamber 60 provided in the dip stick assembly 12, as will be described hereinafter in greater detail.

A vacuum fitting 64 is also provided which is fixed to the bottom wall 50 of the member 24 at a position spaced from the tube 58, the bore 65 of the fitting 64 also communicating with the chamber 42. A flexible hose 66 is provided, one end portion of which is connected to the fitting 64 while the opposite end of the hose 66 is connected to the intake manifold of the vehicle engine. The rate of air flow through the hose 66 is preferably in order of 100 cc. per minute, and such air flow is governed by a restrictor 63 in the hose 66 which serves to reduce the cross-sectional area thereof so that the rate of air flow therethrough is reduced to the desired value. The restrictor 63 may, if desired, be constructed as described in the aforementioned co-pending application of Leonard Boddy.

A cap member 67 spacedly overlies the top wall 28 of the member 22 and is secured thereto by the rivet 32. The peripheral portion of the member 22 is provided with a plurality of circumferentially spaced indentations 68 which permit air to flow under the cap 67 and through a filter 69 which may be made of felt or other suitable material, the filter 69 being interposed between the cap 67 and the top wall 28 of the member 22 so as to entrap dirt, moisture and other foreign matter. In order that air may flow from atmosphere through the indentations 68, the filter 69 and into the chamber 40, a plurality of openings 70 and 72 are provided in the wall 28 of the member 22 and the wall 54 of the guide member, respectively.

The dip stick assembly 12 includes an elongate tubular dip stick 74 adapted to be inserted in the dip stick passageway conventionally provided in the engine blocks of internal combustion engines. While the tubular dip stick is shown as being substantially straight and as being circular in transverse cross-section, it will be understood that the tube may be relatively flexible and adapted to be inserted in a curvilinear dip stick passageway. It will also be understood that the cross-sectional configuration of the tube may be other than circular. The dip stick assembly 12 also includes a housing 75 which defines the chamber 60, the housing 75 being secured to one end portion of the tubular dip stick 74 so that the bore 76 of the dip stick communicates with the chamber 60. The tubular dip stick preferably projects into the chamber 60 and terminates in spaced relationship with respect to the bottom wall of the housing 75, as at 78. The housing 75 is also provided with a cover 80 which carries a fitting 82 that extends through the cover and into the chamber 60, as at 84. The outer end portion of the fitting 82 is connected to the flexible hose 59. The chamber 60 functions to separate entrained oil from air flowing up the bore of the tubular dip stick 74, and also serves as a reservoir for oil in the event the dip stick is inverted.

An opening 86 is provided in the wall of the tubular dip stick at a position near, but spaced from the end 88 thereof remote from the housing 75, the uppermost edge of the opening 86 being located at the critical oil level when the dip stick is positioned in the engine block. In accordance with known practice, and as shown in FIGS. 1, 2, 4 and 6, the opening 86 is formed by notching one side of the tube 74 and is generally elliptical. The narrow but flaring upper end of the opening insures a breaking of the meniscus and a prompt starting of the drainage of oil from the tube 74 as soon as the oil level falls below the upper end of the opening 86. Such a construction insures easy and complete drainage of oil from the tube 74 when the oil level falls below the upper end of the opening 86.

In accordance with the present invention, an elongate relatively thin restrictor 90 is fitted in the bore. The restrictor 90 is preferably formed of a bimetallic material, the low expansion side 92 of the bimetal being disposed so as to face the opening 86 while the high expansion side 94 of the bimetal faces toward the portion of the wall of the tubular member opposite the opening 86. The restrictor 90 includes a diagonally extending portion 95 which projects across the bore 76 so as to reduce the cross-sectional area thereof at a position above the upper edge of the opening 86, as viewed in FIGS. 1, 2, 4 and 6. In plan view, as shown in FIG. 8, the transverse dimensions and configuration of the diagonally extending portion 95 of the restrictor 90 are preferably such that the curved edge 96 of the restrictor is permitted to contact approximately one-half of the circumference of the inner surface of the tubular member 74 as the edge 96 of the restrictor moves transversely of the bore 76 in response to changes in temperature of the oil, the maximum transverse dimension of the restrictor preferably being slightly less than the maximum diameter of the bore 76. The cross-sectional area of the bore of the tubular dip stick is preferably reduced by the restrictor in response to increases in the oil temperature so that a period of at least five or six seconds is required for oil disposed in the bore of the dip stick above the restrictor to drain completely out of the dip stick. The restrictor 90 also includes a substantially flat portion 98 which may be riveted to the wall of the tubular dip stick 74 as by a rivet 100, the rivet 100 being located adjacent the opening 86 so as to facilitate the application of a driving member to the head of the rivet. If desired, a reinforcing member 102 may also be provided between the head of the rivet and the temperature responsive restrictor 90 in order to confine the flat portion 98 and prevent flexure of the portion 98. In order to facilitate locating the restrictor 90 in the bore 76 of the tubular dip stick 74 during assembly and to facilitate effective clamping of the restrictor 90 to the dip stick 74, the end portion 104 of the tubular dip stick is preferably made substantially D-sectioned in transverse cross section, as shown in FIG. 5, so as to provide a substantially flat wall 106 against which the lower end portion 98 of the restrictor is positioned. The portion 108 of the restrictor intermediate the diagonally extending portion 95 and the lower end portion 98 thereof is preferably reduced in transverse cross section so as to provide recesses 110 and 112 which facilitate the drainage of oil out of the bore 76 after the oil has flowed past the diagonally extending portion 95. The neck portion 108 also serves to increase the sensitivity of the restrictor since a relatively small amount of bending of the neck 108 produces a relatively large amount of angular movement of the diagonally extending portion 95.

It will be appreciated that the viscosity of the oil changes as a function of the temperature thereof. The bimetallic restrictor 90 is temperature responsive and varies the cross-sectional area of the bore 76 inversely with changes in the temperature of the oil thereby rendering the discharge rate of oil from the tubular dip stick 74 substantially insensitive to changes in oil viscosity due to variations in the temperature thereof. As previously mentioned, the movement of the portion 95 of the bimetallic restrictor across the bore in response to temperature changes of the oil is preferably such that the cross-sectional area of the bore is reduced as the viscosity of the oil is reduced so that a period of approximately five or six seconds is required for the oil in the bore of the dip stick above the restrictor to drain completely out of the dip stick.

For the purpose of limiting the longitudinal movement of the tubular dip stick in the dip stick passageway in the engine block, an abutment stop 114 may be provided at a position near the housing 75. In order that the opening 86 in the dip stick 74 may be located in a predetermined angular position in the dip stick passageway in the engine block, a locating rod 116 may be provided, one end portion of the locating rod 116 being fixed to the housing 75. The longitudinal axis of the locating rod 116 extends substantially parallel to the longitudinal axis of the tubular dip stick 74, and the rod 116 is angularly aligned with the opening 86. A locating bracket 118 is provided which is fixed to the engine block 120 by any desired means, the bracket 118 having an outwardly projecting flange portion 120 defining an opening 122 adapted to receive the locating rod when the tubular dip stick is in the correct angular position relative to the engine block.

As more fully brought out in the aforementioned copending application, the dynamic and attitude responsive switch 15 may be included in the signal system, the dynamic and attitude responsive switch being effective to control the circuit through the signaling device as a function of the dynamic or static forces acting on the vehicle.

In the installation of the signal system, the switches 14 and 15 are preferably mounted on the fire wall of the vehicle by the bracket 57 which also serves to ground the housing 20 of the switch 14 to the vehicle frame. The vacuum fitting 64 is then connected to the intake manifold of the engine by the hose 66 while the tube 58 is connected by the flexible hose 59 and the fitting 82 to the chamber 60. The tubular dip stick 74 of the dip stick assembly 12 is then inserted, in the manner previously described, into the dip stick passageway provided in the vehicle engine block.

The signal device 16 is preferably mounted on the instrument panel or in any other suitable position on the vehicle where it commands the attention of the vehicle operator when energized, and the signaling device 16 may be connected to the source of potential 18 through a switch 124 which may, for example, be a part of the ignition switch of the vehicle.

In operation, the components of the switch 14 initially occupy the positions illustrated in FIG. 3. Assuming first that the oil level in the engine crankcase is in the safe driving range, so that the level of the oil is above the opening 86 in the tubular dip stick, the initial closure of the switch 124, completes a circuit from the battery 18 through the signal lamp 16, the switch 15, the contact 26, the pin 46, the coil spring 52, the guide member 44 and the member 22 to ground, and the signaling device 16 is energized immediately thereby enabling the operator to ascertain that the signal system is in proper operating condition. Assuming also, that the temperature of the oil in the engine is relatively low, the restrictor 90 in the bore 76 of the tubular dip stick 74 will initially occupy the position illustrated in dotted lines in FIG. 6. When the vehicle engine is started, the pressure in the intake manifold is reduced, thereby lowering the pressure in the chamber 42 of the switch 14 which is connected to the intake manifold through the hose 66. As the pressure in the chamber 42 is lowered, the oil in the engine crankcase or other reservoir will rise in the bore 76 of the tubular dip stick 74, the cross-sectional area of the restricted portion of the bore 76 being relatively large since the restrictor assumes the position illustrated in dotted lines in FIG. 6 at relatively low temperatures. When the oil reaches a relatively high temperature, the restrictor assumes the position illustrated in full lines in FIG. 6. Since the chamber 40 is at atmospheric pressure while the pressure in the chamber 42 is reduced, the pressure differential will cause the diaphragm 34 to move downwardly against the spring 48. The pin 46 will also move downwardly with the diaphragm 34 due to the action of the spring 52 so as to effect a separation of the pin 46 from the fixed contact 26, thereby interrupting the above-traced circuit and de-energizing the signaling device 16. The strength of the spring 48 is preferably such that it will permit the diaphragm to move downwardly to effect a separation of the pin 46 from its contact 26 after the oil has risen approximately three inches in the bore of the tubular dip stick. As the manifold pressure decreases, the diaphragm 34 and the pin 46 continue to move downwardly until the collar portion 128 on the pin 46 strikes the top wall 54 of the guide member 44, thereby halting the downward movement of the pin 46. The diaphragm 34 is free to continue its downward movement, however, so that the valve seat 37 moves away from the frusto-conical portion 51 of the pin 46 thereby opening the passageway 38 and permitting atmospheric air to bleed through the passageway 38 into the chamber 42. This opening of the valve preferably takes place when the oil has risen approximately eight inches in the dip stick, such height being equivalent to approximately one half inch of mercury, and being well below the position of the chamber 60. As the engine operates, air will continue to bleed through the passageway 38 into the chamber 42 thereby maintaining the reduction in pressure in the chamber 42 at approximately one half inch of mercury irrespective of manifold vacuum.

Assuming that the oil level in the engine crankcase falls below the aperture 86 in the tubular dip stick, the oil will drain out of the bore 76 of the tubular dip stick thereby permitting air to flow from the engine crankcase through the bore 76 of the dip stick into the chamber 42 so as to raise the pressure in the chamber 42 to substantially atmospheric pressure. With the pressure differential eliminated, the spring 48 urges the diaphragm 34 upwardly to close the passageway 38, while the spring 52 urges the pin 46 against the valve seat 37 so that the pin 46 moves upwardly with the diaphragm 34 and contacts the fixed contact 26. When the pin 46 contacts the fixed contact 26, the electrical circuit through the switch 14 is completed thereby causing the signal device 16 to be energized so as to warn the operator that the oil level is dangerously low.

The above described arrangement is critically and accurately responsive to oil level. The opening or closing of the signal contacts 26—46 occurs in response to a very small change in oil level, from a value just sufficient to cover the orifice 86 to a value at which enough of the orifice 86 is exposed to permit air at the rate at which it is extracted through tube 66. This small change in oil level renders the manifold vacuum effective or ineffective to act on the diaphragm 34. At the same time, the restrictor 90 varies the cross-sectional area of the bore of the tubular member inversely as a function of changes in the temperature and directly with changes in the viscosity of the oil, the cross-sectional area being increased proportionately to the increase in viscosity of the oil. Transient signals due to temporary changes in oil level are thus eliminated since the restrictor 90 varies the cross-sectional area of the bore in a manner such that a period of approximately five or six seconds is required for the oil to drain completely out of the tubular dip stick.

While a preferred embodiment of the invention has been shown and described, it will be understood that various changes and modifications may be made without departing from the spirit of the invention.

What is claimed is:

1. A signal system for responding to a critical liquid level condition, comprising a fluid pressure responsive control element, means for applying a fluid pressure differential to said control element, means including a fluid passage opened and closed by changes in liquid level for so modifying said fluid pressure differential as to actuate said control element, and means movable as a function of the temperature of the fluid and operable to maintain the rate of flow through the fluid passage substantially constant.

2. A dip stick assembly for use in a signal system for responding to the existence of a critical liquid level condition in an internal combustion engine having a dip stick passageway, said dip stick assembly including a tubular dip stick defining a bore, said tubular dip stick having an opening in the side wall thereof at a position spaced from one end thereof, the uppermost edge of the opening being located at a critical level of the liquid in the engine when the dip stick is positioned in the dip stick passageway of the engine, and means in the bore movable as a function of the temperature of the liquid and operable to maintain the rate of flow of fluid through the bore substantially constant.

3. A dip stick assembly for use in a signal system for responding to the existence of a critical liquid level condition in an internal combustion engine having a dip stick passageway, said dip stick assembly including an elongate tubular member defining a bore open at each end, said tubular member having an opening in the side wall thereof at a position spaced from one end thereof, the uppermost edge of the opening being located at a critical level of the liquid in the engine when the dip stick is positioned in the dip stick passageway of the engine, and a laminated bimetallic element, said bimetallic element being positioned in the bore of said tubular member and fixed to said tubular member whereby a portion of said bimetallic element is disposed intermediate the opening in the wall of said tubular member and the other end of said tubular member, said portion of said bimetallic element being movable transversely of the bore of said tubular member so as to vary the cross-sectional area of the bore inversely with the temperature of the liquid, the transverse dimension of an intermediate portion of said bimetallic element being less than the maximum transverse dimension of said movable portion thereof.

References Cited in the file of this patent

UNITED STATES PATENTS

| | | |
|---|---|---|
| 1,376,818 | Lippert | Aug. 8, 1915 |
| 1,564,504 | Woolson | Dec. 8, 1925 |
| 2,455,305 | Heva | Nov. 30, 1948 |
| 2,588,761 | Raby | Mar. 11, 1952 |
| 2,626,386 | Raby | Jan. 20, 1953 |
| 2,671,893 | Van Skoy et al. | Mar. 9, 1954 |